(No Model.) 8 Sheets—Sheet 1.
C. WEGENER.
COAL DUST FIRING APPARATUS.

No. 554,327. Patented Feb. 11, 1896.

Witnesses:
Chas. E. Riordon
Wm. B. Crowell

Inventor:
Carl Wegener
By Butterworth & Dowell
his atty's

ANDREW B. GRAHAM, PHOTO-LITHO. WASHINGTON, D.C.

(No Model.) 8 Sheets—Sheet 2.
C. WEGENER.
COAL DUST FIRING APPARATUS.

No. 554,327. Patented Feb. 11, 1896.

Witnesses:
Chas. E. Riordon
Wm. B. Crowell

Inventor:
Carl Wegener
By Butterworth & Dowell
his atty's (No Model.) 8 Sheets—Sheet 3.
C. WEGENER.
COAL DUST FIRING APPARATUS.
No. 554,327. Patented Feb. 11, 1896.
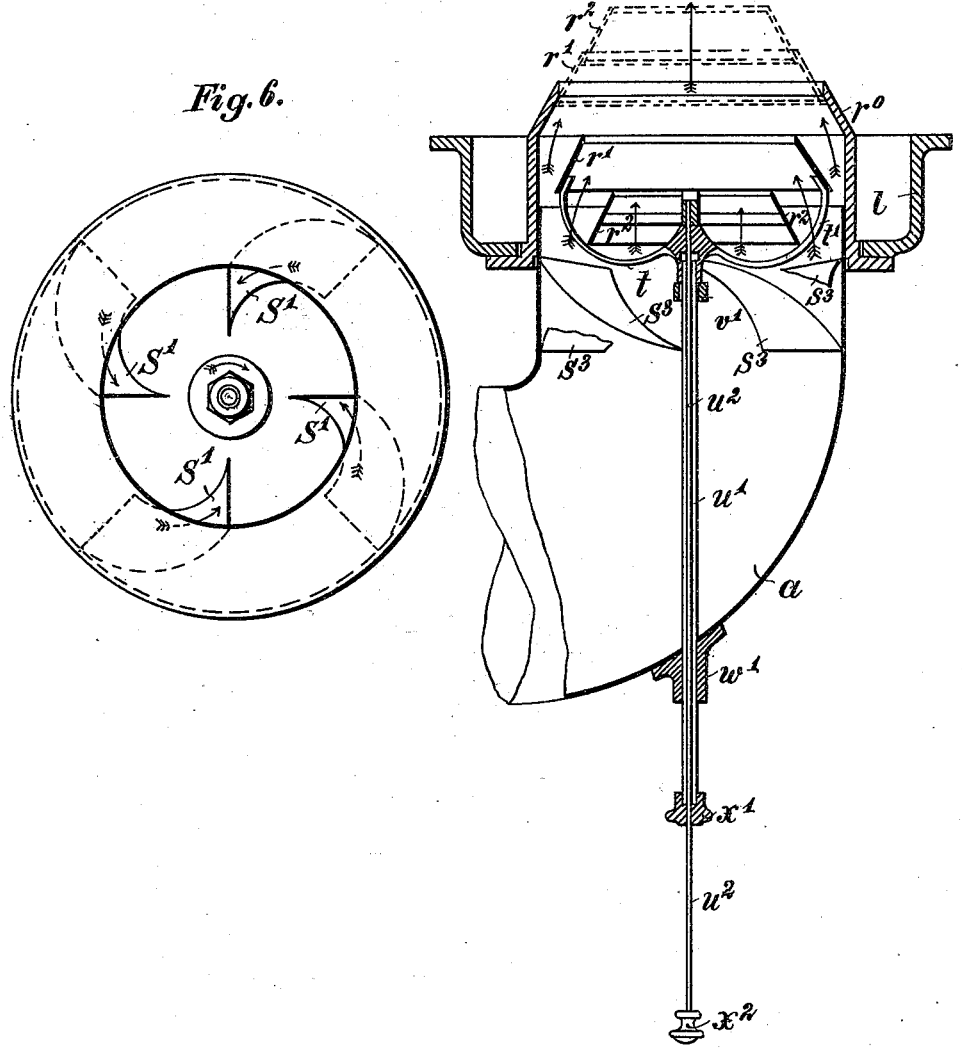

(No Model.) 8 Sheets—Sheet 4.
C. WEGENER.
COAL DUST FIRING APPARATUS.
No. 554,327. Patented Feb. 11, 1896.
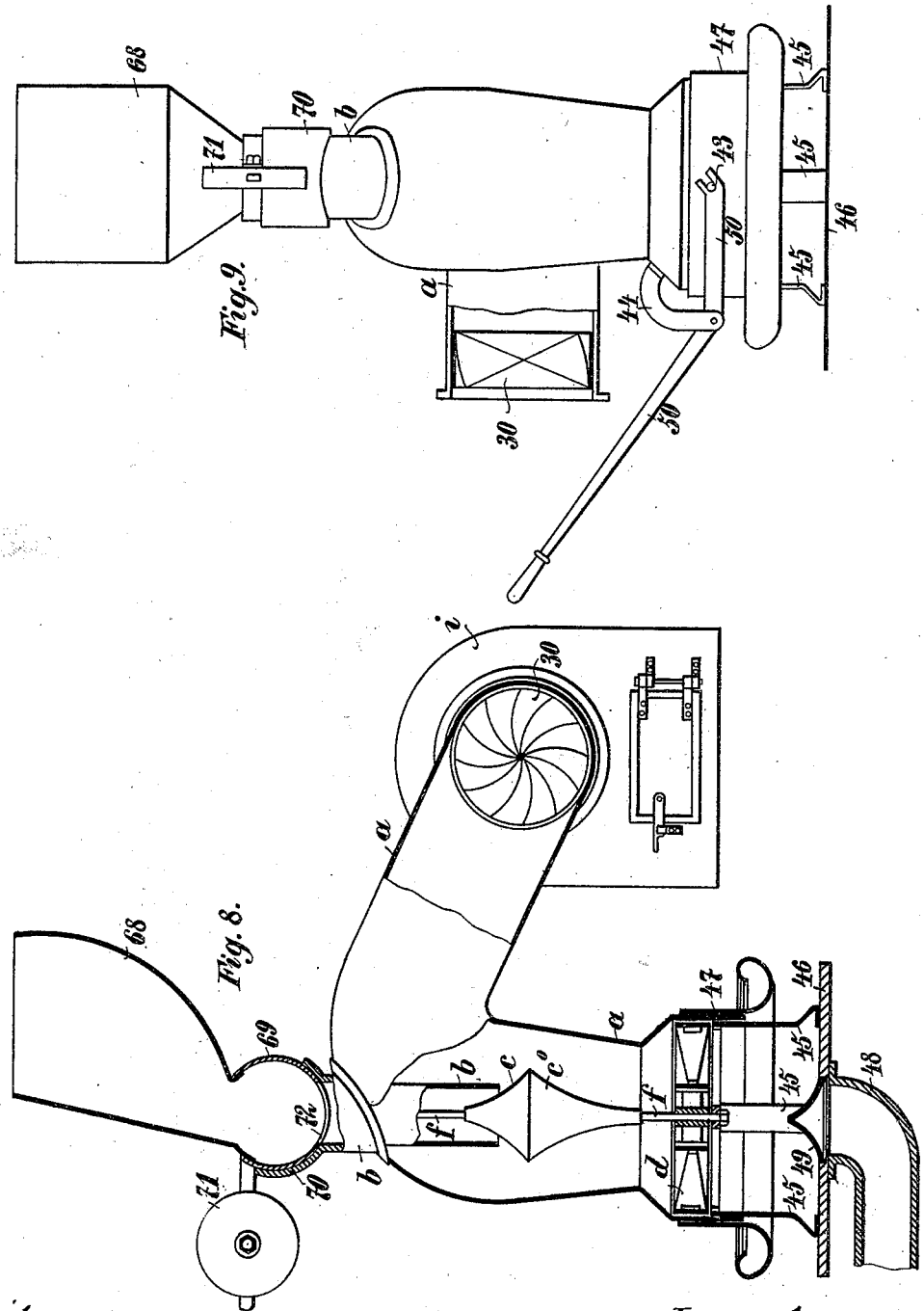

(No Model.) 8 Sheets—Sheet 5.

C. WEGENER.
COAL DUST FIRING APPARATUS.

No. 554,327. Patented Feb. 11, 1896.

Witnesses:
Chas. E. Riordon
Wm. B. Crowell

Inventor:
Carl Wegener
By Butterworth & Dowell
his attys (No Model.) 8 Sheets—Sheet 6.
C. WEGENER.
COAL DUST FIRING APPARATUS.

No. 554,327. Patented Feb. 11, 1896.

Witnesses:
Chas. E. Riorden
Wm. B. Crowell

Inventor:
Carl Wegener
By Butterworth & Dowell
his attys (No Model.) 8 Sheets—Sheet 7.
C. WEGENER.
COAL DUST FIRING APPARATUS.
No. 554,327. Patented Feb. 11, 1896.
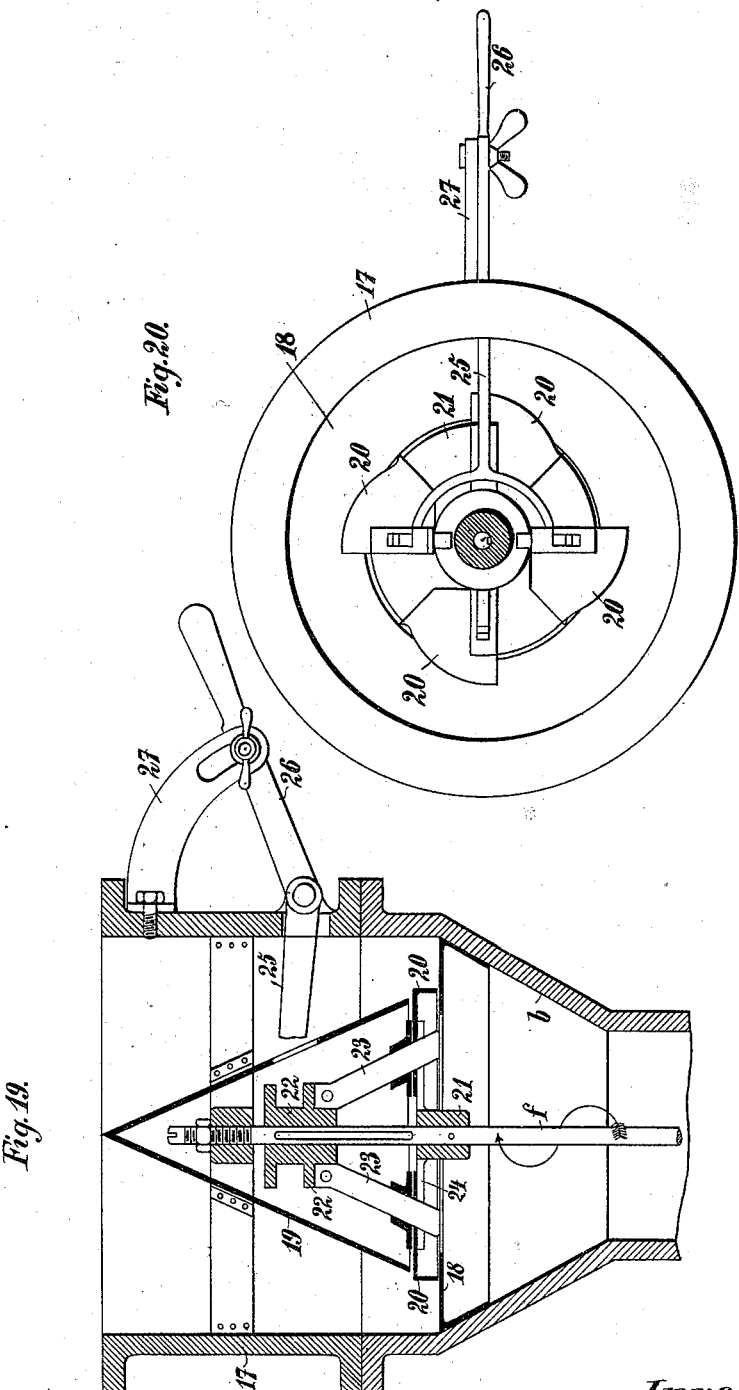
Witnesses:
Chas. E. Riordon
Wm. B. Crowell.
Inventor:
Carl Wegener
By Butterworth and Dowell
his attys (No Model.) 8 Sheets—Sheet 8.
C. WEGENER.
COAL DUST FIRING APPARATUS.
No. 554,327. Patented Feb. 11, 1896.
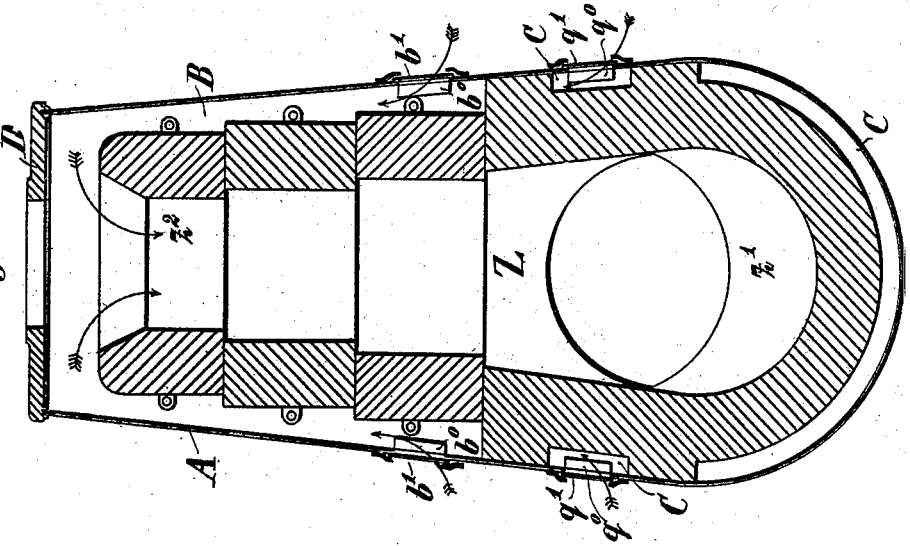
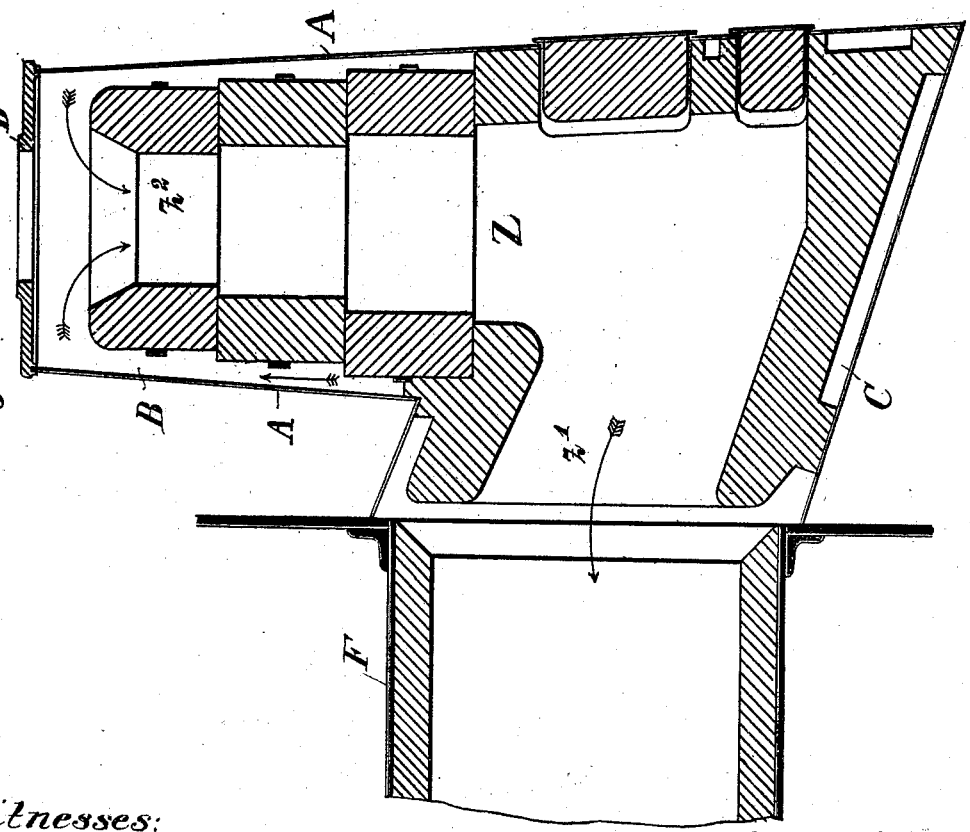
Witnesses:
Chas. E. Riordon
Wm. B. Crowell
Inventor:
Carl Wegener
By Butterworth & Dowell
his att'ys

UNITED STATES PATENT OFFICE.

CARL WEGENER, OF BERLIN, GERMANY.

COAL-DUST-FIRING APPARATUS.

SPECIFICATION forming part of Letters Patent No. 554,327, dated February 11, 1896.

Application filed December 10, 1894. Serial No. 531,402. (No model.) Patented in Belgium September 17, 1894, No. 111,845; in Luxemburg September 18, 1894, No. 2,115, and in Austria October 12, 1894, No. 44/5,428.

*To all whom it may concern:*

Be it known that I, CARL WEGENER, a subject of the King of Prussia, German Emperor, residing at Berlin, in the Kingdom of Prussia, German Empire, have invented a new and useful Coal-Dust-Firing Apparatus, (for which I have obtained patents in Luxemburg, No. 2,115, bearing date September 18, 1894; in Belgium, No. 111,845, bearing date September 17, 1894, and in Austria, No. 44/5,428, bearing date October 12, 1894,) of which the following is a specification.

Figure 1:
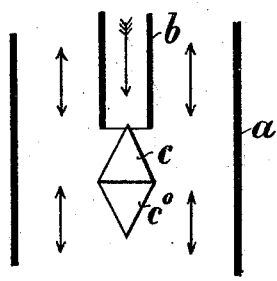
Figure 3:
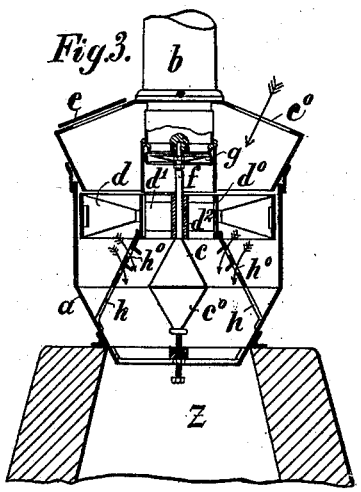
Figure 2:
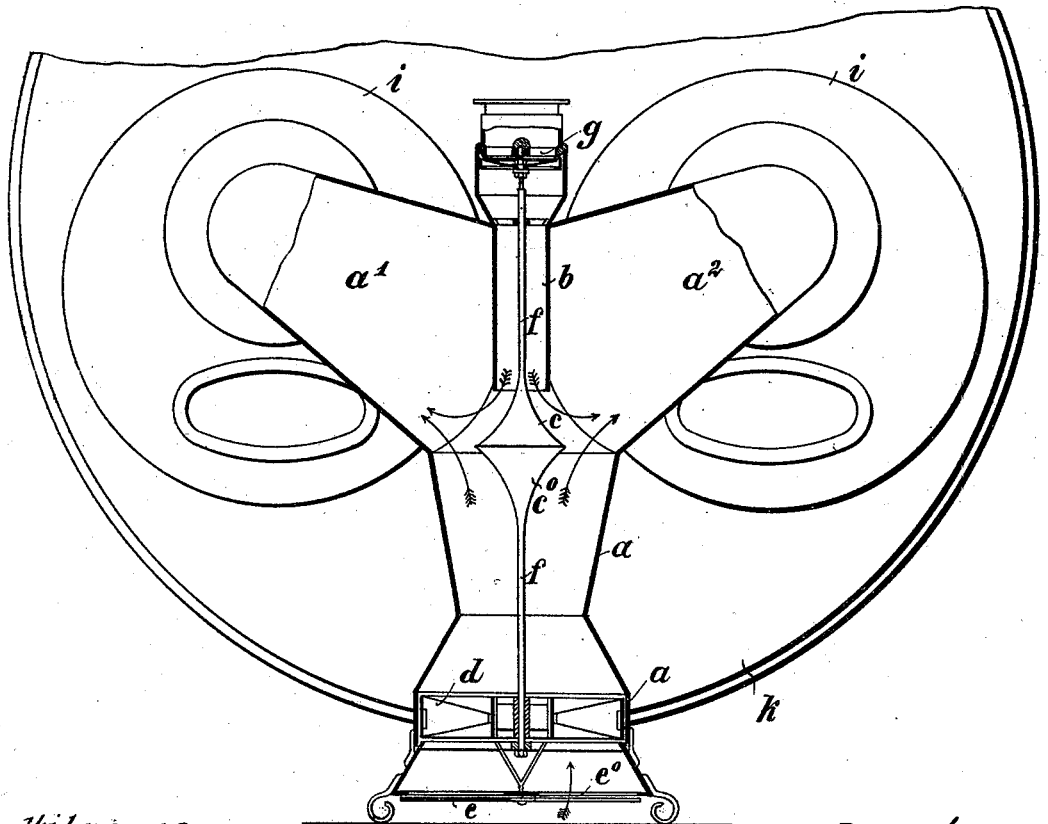
Figure 4:
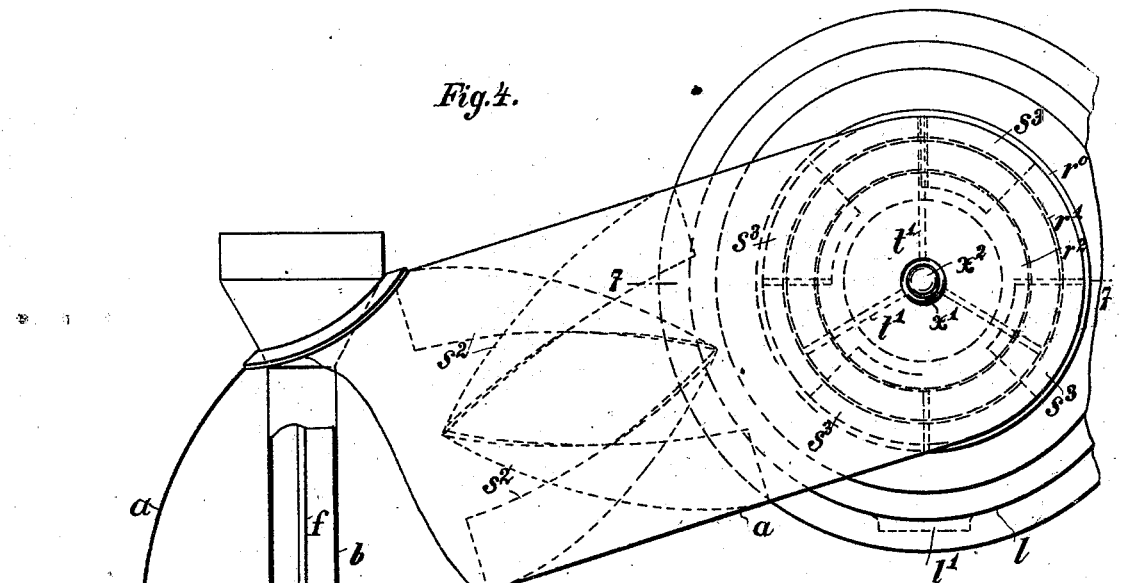
Figure 5:
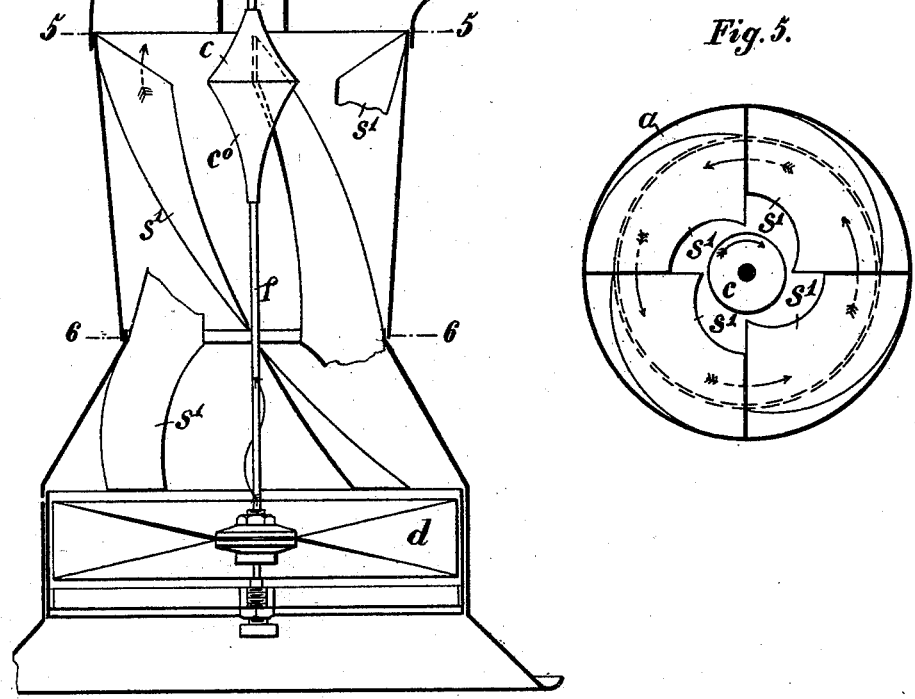
Figure 14:
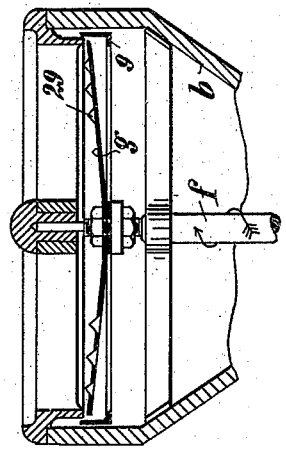
Figure 15:
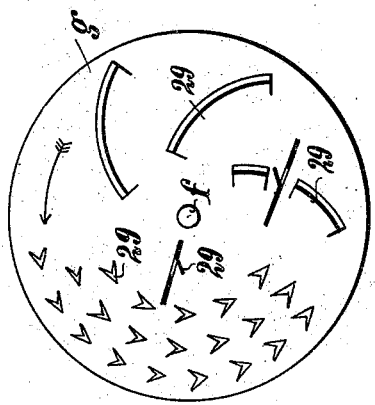
Figure 13:
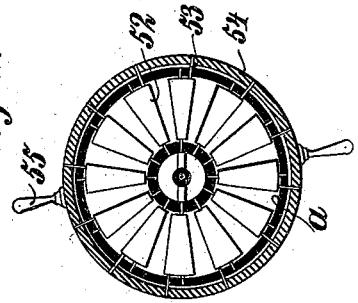
Figure 10:
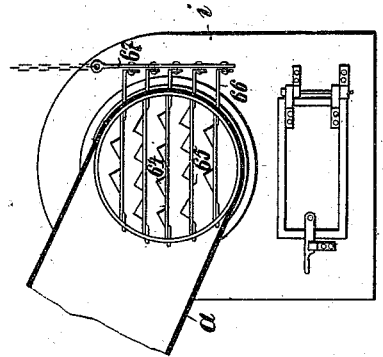
Figure 16:
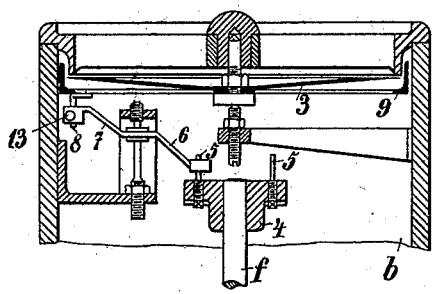
Figure 17:
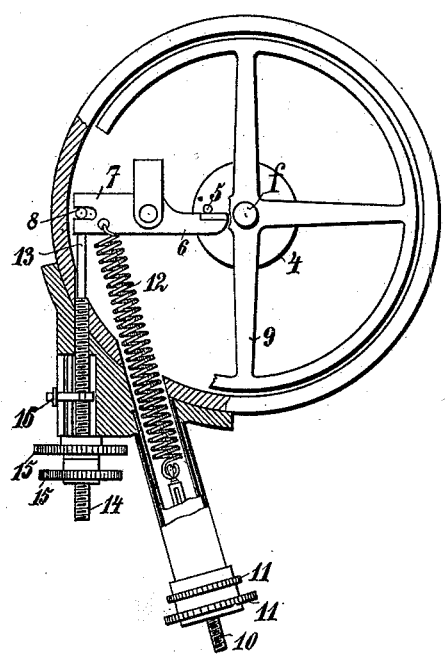
Figure 18:
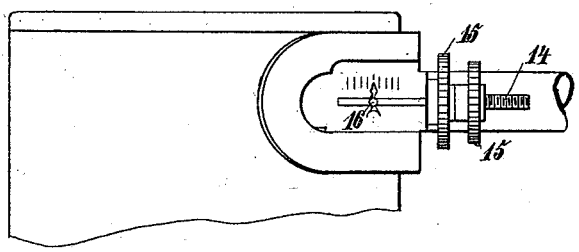

Figure 1 represents by a diagram the general arrangement of a firing apparatus constructed according to my invention. Fig. 2 represents in a vertical section a firing apparatus of the new kind. Fig. 3 represents in a vertical section another firing apparatus. Fig. 4 represents a vertical sectional elevation of a third firing apparatus. Fig. 5 is a sectional plan view taken on the line 5 5 of Fig. 4. Fig. 6 is a sectional plan view taken on the line 6 6 of Fig. 4. Fig. 7 is a fragmentary sectional plan view taken on the line 7 7 of Fig. 4. Fig. 8 represents in a vertical section, and Fig. 9 in a side view, a fourth firing apparatus constructed according to my invention. Fig. 10 represents in an elevation, and Fig. 11 in a vertical section, an accessory device of the apparatus. Fig. 12 represents in a vertical section, and Fig. 13 represents in a plan, another accessory device. Fig. 14 represents in a vertical section, and Fig. 15 represents in a plan, a third accessory contrivance. Fig. 16 represents in a vertical section, Fig. 17 represents in a plan, and Fig. 18 represents in an elevation, a fourth accessory mechanism. Fig. 19 represents in a vertical section, and Fig. 20 represents in a plan, an accessory contrivance equivalent to that shown in Figs. 14 and 15. Figs. 21 and 22 represent in vertical sections a complemental part of the new apparatus.

The coal-dust-firing apparatus, which will be hereinafter explained, belongs to that class in which the air forced into the combustion-chamber by means of a suitable blowing apparatus or by means of the natural draft of the chimney is charged on its way to the combustion-chamber with the fuel or material which is to be burned.

The main feature of the invention consists in that the feeding of the dust into the current of air, as shown by the diagram Fig. 1 of the accompanying drawings, takes place while the current of air is moving in a vertical direction, whether it be rising or descending. The dust falls from the feeding apparatus arranged underneath the storage-hopper through a vertical feed-pipe $b$, arranged in the center of the air-passage $a$, onto a distributing device $c$, also placed centrally underneath the mouth of this pipe, this distributing device being, for instance, a cone or conoid with an upwardly-directed point or another suitably-shaped diverting-surface arranged so as to direct the dust outward, and the latter slides off this surface through an annular space between the distributing-body $c$ and the wall of the air-passage $a$ toward the latter, so that it is taken up in a state of even distribution by the air passing through the annular space and carried forward with this air.

In order to prevent the speed of the air-current being reduced by the formation of a vortex, a second downwardly-directed diverting-surface, $c^0$, is preferably attached to the under side of the diverting-surface $c$. The movement of the dust along the distributing or diverting body $c$ may be accelerated and insured by imparting to this body a rotary motion on its central axis. It is preferable to utilize the current of air set in motion by the blast apparatus or by the draft of the chimney for producing this rotary movement by means of a fan-wheel $d$. (Figs. 2 and 3.)

Fig. 2 shows as an example a form of construction of this improved arrangement, the air-current in this case being directed upward. The admission of the air, drawn in by the chimney, through the openings $e^0$ of the air-pipe $a$ may be suitably regulated by means of revolving slides or dampers $e$, or in any other suitable manner. The air in its course through the pipe $a$ first sets the fan-wheel $d$ in rotation, the spindle $f$ of which carries the double conoid $c\ c^0$ and, on an upper extension, the feeding device $g$. It then becomes charged at the level of the distributing-body $c\ c^0$ with the fuel, and is carried away at the sides above the lower opening of the feed-pipe $b$. In the example shown, the air-passage $a$ branches into two pipes $a'$ $a^2$, each of which opens into one of the flues (which are closed by means of a cover-plate $i$) of a Cornish boiler R, in which the combustion-chambers are arranged.

Fig. 3 shows a coal-dust-burning apparatus of the kind hereinbefore described with the current of air directed downward. The air drawn in by the draft of the chimney obtains access through the openings $e^0$, which may be regulated by means of slides, valves or flaps $e$, to the annular space formed by the feed-pipe $b$ within the pipe $a$, and passes the annular fan-wheel $d$, the inner rim $d^0$ of which forms a rotating continuation of the feed-pipe $p$. The spindle $f$, on which the fan-wheel $d$ is fastened by the spokes $d'$ and the nave $d^2$, (the spokes being preferably formed of sheet metal,) has at the top a rotary feeding device $g$ and below it the double cone $c$ $c^0$. In order to cause the air to encounter the particles of dust sliding down from off the cone as far as possible in a direction vertical to their way, the wall of the tube $a$ is tapered inward and downward at the level of the counter-cone $c^0$ and has further a conical casing $h$ fastened in the tube $a$ parallel to the cone $c$, which casing diverts the air, which has passed through the fan-wheel $d$, against the tapering lower parts of the wall of the tube $a$, so that it assumes the direction of the same. Small perforations or openings $h^0$ are preferably made in the casing $h$, which openings allow a portion of the air to pass inward in proximity to the double cone $c$ $c^0$. The air charged with the fuel reaches the combustion-chamber Z through the lower opening of the tube $a$.

The inlet end of the air-pipe $a$ may, in both the forms of construction, be also connected to an air-conduit, if it be desired that the current of air for the combustion shall be produced by means of a blowing apparatus instead of by the natural draft of the furnace.

Figs. 4 to 7 show a further developed form of a coal-dust-firing apparatus of the kind of which an example has already been shown in Fig. 2. This is characterized by two improvements, one of which consists of an arrangement for imparting to the air-current, which conveys the coal-dust to the combustion-chamber, a rotary motion on its axis in addition to the forward one, whereof results a spiral movement advantageous for maintaining the even distribution of the dust in the current of air. If the movement of the particles of air has already been changed into a spiral one before they have become charged with the coal-dust on their passage over the distributing-body, the thorough admixture of the latter with the air is thereby facilitated, and more particularly if the direction of rotation of the rotary distributing-body is opposite to that of the current of air. The rotation of the straight-flowing air-current is produced by means of spiral surfaces which project from the wall of the air-pipe, and are preferably not united in the middle but leave an inner space.

The other improvement allows the devices for regulating the quantity of air which is to be mixed with the dust to be placed in the exit-opening of the air-pipe. This regulation is produced by a gradual diminution of the size of the opening. For this object rings in the form of a truncated cone are arranged one behind the other within the air-pipe, and co-axial with the same, which rings only slightly diminish the section of the air-pipe. These rings may be serially adjusted in the exit-opening and are of such dimensions that the latter is gradually diminished in size.

The spiral surfaces are arranged in three groups, the first of which, $s'$, is placed in front of the distributing or diverting body $c$, the second, $s^2$, behind the same, and the third, $s^3$, in front of the opening into the combustion-chamber of the air-pipe $a$.

The diminution of the exit-opening, Figs. 4 and 7, is, in the example shown in the drawings, assumed to be from the outside inward. The mouth of the air-pipe $a$, which is surrounded with a chamber $l$ having one or more inlet-nozzles $l'$, Fig. 7, serving for supplying additional air into the combustion-chamber, is for this purpose provided with a fixed conical extension $r^0$. Against this latter the tapering ring $r'$ may be adjusted, which in turn may serve as a support for the second ring, $r^2$. The first ring, $r'$, is fastened with its spokes $t'$ on a tube $u'$ which is guided within the air-tube in the cross-bar $v'$, and which passes through a socket $w'$ on the bend of the air-pipe. A knob $x'$ on the end of the tube $u'$ serves as a handle for adjusting the ring $r'$. The second ring, $r^2$, is attached by its spokes to a rod $u^2$ passing through the tube $u'$, and the outer end of which rod, projecting from this tube, ends again in a knob $x^2$. By pushing in the knob $x'$ both rings are moved toward the nozzle-shaped projection $r^0$ until the ring $r'$ rests against the same. The pushing in of the knob $x^2$ then brings also the second ring, $r^2$, into the position shown in dotted lines, in which it forms a continuation of the first.

Figs. 8 and 9 show a form of construction of the invention in case the apparatus is to be operated sometimes with natural draft and sometimes with forced draft, as in the case of marine boilers, for instance. The device for regulating the quantity of air which is to be drawn in for the combustion by the chimney is here again placed on the inlet-opening of the air-pipe $a$, and also serves for entirely shutting off this inlet of air when the forced draft is to be used. The air-pipe $a$, which rests on the feet 45, stands a suitable distance away from the bottom plate 46 and has an adjustable casing 47, the lower edge of which extends over the air-pipe and is curved round to the outside, so that an annular receiving-opening is formed, which, by its shape, favors a noiseless inflow of the air. The central blast-pipe 48, which opens in the bottom plate 46, is preferably closed by a cover 49 of such a form that the air flowing radially inward may as far as possible unite to a compact axial current. The lowering of the casing 47 reduces the section of the annular inlet for the air drawn in by the draft of the chimney. This movement is brought about by means of a lever 50 which is mounted in a fork 44 attached to the air-pipe $a$, and has a forked part half embracing the air-pipe, the outer ends of which forked part have slots which engage the pins 43 fixed at diametrically-opposite points on the cylindrical sliding casing 47, so that this casing, on the hand-lever being operated, is moved upward or downward. If the blast-pipe 48 is to be used, the cover 49 is removed and the casing 47 is let down to the bottom plate 46.

The lower end 69 of the feed-hopper 68 is formed as an oscillatory hollow cylindrical valve in the socket 70, into which the upper end of the tube $b$ opens. The hopper is arranged above the rotating feeding device, which is mounted on the upper end of the spindle $f$ within the tube $b$, and is maintained in an erect position (in which its lower opening 72 coincides with the opening of the tube $b$) by means of a weighted lever 71 bearing against the socket 70. If the hopper 68 is to be refilled, it is turned to the right until its opening 72 is closed. As it is then disconnected from the tube $b$ containing the feeding device, the renewal of the supply in the hopper cannot impede the regular action of this feeding device.

In order to again re-establish the uniform suspension of the particles of dust, so far as this suspension may have been lost, on the entrance of the mixture of air and dust into the combustion-chamber a fixed spiral fan-wheel 30 is arranged in the exit-opening of the air-pipe $a$, which fan-wheel imparts a whirling motion to the mixture passing through it.

Figure 11:
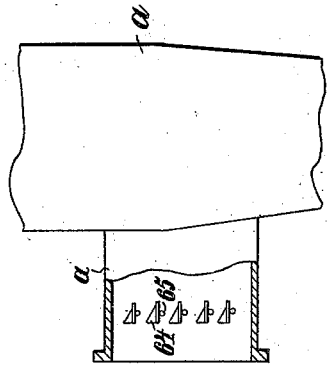
Figure 12:
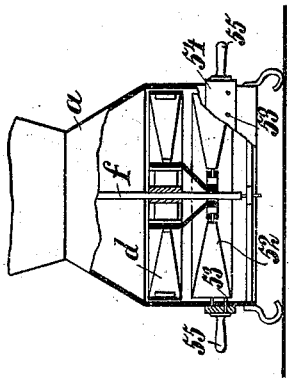

A device which may be substituted for the fixed spiral fan-wheel 30 is shown in Figs. 10 and 11, corresponding to Figs. 8 and 9, which device serves the same purpose, but even more effectively, because it produces within the whole current a number of smaller vortices traveling side by side. Diverting-plates 64 are arranged alternately in opposite directions in the exit-opening of the air-pipe $a$ in such a way that they are equally distributed over the whole section of the air-passage. These diverting-plates may be held in position in any suitable manner—for instance, by arranging them on parallel bars 65, which, as shown in Fig. 10, are preferably pivoted in the wall of the air-pipe so as to be turned on their longitudinal axes, and adjusted to any suitable position, like louver-boards, by means of lever-arms 66 and a draw-bar 67 connecting these. The draw-bar 67 may be arranged so as to be directly operated by hand, the links of a chain attached thereto allowing of its being fixed in any desired position.

A device for regulating the quantity of air passing through the air-pipe $a$, which device may replace with advantage the one shown in Fig. 2, is shown in vertical section in Fig. 12 and in horizontal section in Fig. 13. A second fan-wheel is arranged immovably under the rotary fan-wheel $d$, the vanes 52 of this second fan-wheel being made revoluble in the nave and the rim, and having on the outer ends eccentric-pins 53, which are passed through holes (slots) in the wall of the air-pipe $a$ and are attached outside to a common ring 54 which is provided with handles 55. The slots in the wall of the air-pipe are of such a form and in such a position that a rotation of the ring causes a rotation of the fan-vanes on their axes, so that the opening between two adjacent vanes may be diminished or increased in order to regulate the section of the passage. The vanes 52 have an opposite direction to the vanes of the rotary fan $d$, so that their surfaces serve as directing-surfaces for the air which operates the wheel $d$.

Figs. 14 and 15 show the feeding device $g$ mounted on the upper end of the spindle $f$, which feeding device is formed of a disk filled with cutters or knives. This knife-disk is firmly connected with a ring 9 which prevents the particles of dust passing to the outside over the edge of the disk, which latter consists preferably of a flat or somewhat concave sheet-metal disk, the separate knives 29 of which may be of any suitable form. The knives are preferably formed out of the sheet-metal disk itself by this disk having suitable pieces partly cut out in the desired form and then bent up. These knives, which may be of triangular, curved or other suitable form, project upward out of the disk, as may be seen in the two partial sections shown in Fig. 15.

In place of the rotary knife-disk $g$, feeding devices for coal-dust are also, as is well known, employed in the form of a disk-shaped sieve or grate oscillating on its axis.

Figs. 16 and 17 show device for converting the rotation of the spindle $f$ into the oscillating movement of such sieve, without necessitating a perforation of the wall of the tube $b$, a suitable tight joint being with difficulty obtained at such perforation.

Fig. 18 shows the devices belonging thereto for regulating the speed and the extent of the movement of the sieve. The spindle $f$ is provided at its upper end with a disk 4 with two catch-pins 5, which act on a double lever 6 7 arranged within the pipe $b$. The fork-shaped end 7 of this double lever embraces a pin 8 which extends downward from a frame 9 firmly screwed to the sieve 3, so that the turning of the lever 6 7 produced by the pins 5 causes a movement of the sieve 3. In order to turn the lever back again, a spring 12 is employed which acts on the double lever and is adjustable from the outside by means of the screw 10 and the nuts 11. This return movement is limited by the stop 13, the position of which may be adjusted from the outside, according to a scale and a pointer 16, by means of the screw 14 and the nuts 15. By the adjustment of the spring 12 the return movement of the sieve may be made more or less violent according to the more or less lumpy condition of the dust which is to be disintegrated and supplied to the current of air. By the adjustment of the stop 13 the extent of the movement, and thus the quantity of the dust passed through the sieve, may be regulated.

The circular sieve which oscillates on its axis may be replaced by one moving to and fro in a straight line. The device for transforming the rotary movement into a movement to and fro, as well as the regulating devices, may remain the same.

A further device for disintegrating the coal-dust and causing it to descend by gravity, which may be employed to replace the one just described, as well as the knife-disk $g$, is shown in Figs. 19 and 20. The chamber filled with dust beneath the supply-hopper consists in the cylinder 17 provided at the bottom with the annular disk or flat ring 18 and within with the cone 19. Between the cone 19 and the ring 18 there is an annular interstice through which scoops or paddles 20 project from the inside to the outside. These rest on a disk 21 carried by the rotating central spindle $f$ and move on their rotation with this spindle close over the ring 18, so that by the cam-shaped form of their edges they force the dust which has descended onto the ring 18 toward the inner edge of this ring, from whence it falls into the passage $b$.

In order to be able to regulate the quantity of the dust scooped down, a novel arrangement for the radial adjustment of the scoops or paddles is employed. These are mounted loosely on converging guide-bars 23, firmly connected to a sleeve 22, which is vertically adjustable on the spindle $f$, so as to revolve with it, each of these guide-bars extending through a radial slot 24 in the disk 21. If the sleeve 22 be raised or lowered by means of the double lever 25 26, which may be attached to the guide-piece 27, the paddles 20, which rest on the disk 21, are separated or pushed together.

The arrangement of a furnace to be placed in front of the boiler F, hereinafter called a "front furnace," (shown in Figs. 21 and 22,) forms the completion of the apparatus shown in Fig. 3, which has its air supply from above. While in Fig. 3 it was assumed that the air-pipe $a$ opened immediately into the upper opening of the vertical combustion-chamber Z, it is here supposed to be attached to the cover D of the body of the front furnace. The air for the combustion in this arrangement only partially passes over the distributing apparatus $c$, (shown in Fig. 3,) and then, together with the coal-dust, through the opening of the lid D. Another part mingles with this current beneath the cover D and before it enters into the combustion-chamber Z. This second part of the air for the combustion undergoes a considerable preliminary heating, as, on its course to the inlet-opening, it flows through a chamber between the fire-brick chamber in which the combustion takes place and an outer casing, the further object of which is to diminish the loss of heat which takes place through the radiation of the heated fire-clay body, and to avoid some other drawbacks connected with the high temperature of this latter. The fire-clay chamber Z, the horizontal part $z'$ of which is supposed to open into the fire-flue F of a steam-boiler, is connected with the sheet-metal casing A in such a way that two separate chambers B and C are formed, the first of which surrounds the vertical part $z^2$ of the chamber Z and the latter the horizontal part $z'$. The annular space B is closed above by the cover-plate D placed on the casing A, through the central opening of which plate the mixture of fuel and air flows downward. The second part of the air, the quantity of which may be regulated by means of slides $b'$, passes through the openings $b^0$ into the lower part of the annular space B, and leaves the latter through the annular opening between the upper edge of the vertical part $z^2$ of the fire-clay chamber Z and the cover D in order to descend into the combustion-chamber together with the mixture of air and dust which descends through the opening in the cover. The chamber or space C is fed with air through openings $q^0$, which may also be regulated by means of slides or dampers $q'$, and the air quits the same through the annular interstice which is left between the mouth of the horizontal part $z'$ and the entrance of the fire-flue F by the mouth of the casing A, resting against the front of the boiler, being carried somewhat beyond the mouth of the horizontal part $z'$. This third part of the air then becomes mixed with the current of the fire-gases on the latter passing out of the fire-clay chamber into the fire-flue and completes the combustion of the same.

The vertical part $z^2$ of the fire-clay chamber is, as shown in the drawings, preferably formed of separate sections, to which a great firmness may be given by means of rings.

If a blast apparatus be employed for conveying the fuel through the opening of the cover-plate D, it may be necessary to connect the air-inlet openings $b^0 q^0$ with the blast-pipe. If two boilers or furnaces placed side by side are to be heated with one apparatus, the body of the front furnace has two horizontal parts in which the fire-gases branch.

What I claim as my invention, and desire to secure by Letters Patent of the United States, is—

1. In a coal-dust-firing apparatus, the combination with a suitable gas or air supply pipe, of a coal-dust-supply pipe arranged to communicate with said air-supply pipe, a rotary coal-dust-deflecting device arranged adjacent to the outlet of said coal-dust-supply pipe, together with means for rotating said deflecting device, whereby the said dust and air may be thoroughly commingled, substantially as and for the purpose described.

2. A coal-dust-firing apparatus, comprising a suitable gas or air supply pipe, means for supplying coal-dust to said air-supply pipe in a direction opposed to the flow of the air, and a deflecting device having opposed deflecting-surfaces arranged in the air-supply pipe adjacent to the inlet for the coal-dust so that the particles of the fuel may be separated and made to better commingle with the supply of air, substantially as and for the purpose described.

3. A coal-dust-firing apparatus, comprising a suitable gas or air supply pipe, means for supplying coal-dust to said air-supply pipe, and a rotary coal-deflecting device arranged adjacent to the inlet for the coal-dust, means for rotating said deflecting device, and means for imparting a whirling motion to the air so as to commingle with the coal-dust, substantially as described.

4. A coal-dust-firing apparatus, comprising a suitable gas or air supply pipe, means for supplying coal-dust to said air-supply pipe, an adjustable casing surrounding the air-pipe at its entrance-opening, a transverse plate against which the casing is adapted to abut to form a close joint; said plate being provided with an air-opening, a pipe arranged to supply air under pressure through the opening in the plate to the air-supply pipe, and means for cutting off the supply of air under pressure, substantially as described.

5. In a coal-dust-firing apparatus, the combination with a suitable air-supply pipe, of a feeding device and means for conveying the fuel to the air-pipe, an oscillatory hollow valve located above the feeding device and arranged to permit the fuel to be deposited upon said feeding device, together with a hopper carried by and oscillating with said valve and having an opening communicating with the interior of the hollow valve, substantially as described.

6. In a coal-dust-firing apparatus, the combination with an air-supply pipe, of a coal-dust-supply pipe having an opening into said air-pipe, a coal-dust-deflecting device arranged in the air-supply pipe beneath the opening of the coal-dust or fuel supply pipe, a rotatable shaft to which said deflecting device is secured, a fan-wheel secured to this shaft and operated by a current of air so as to rotate the deflecting device, an immovable fan-wheel the vanes of which are adjustable to different angles so as to properly direct the air to the driving fan-wheel, together with means for simultaneously adjusting the vanes of said immovable fan-wheel, substantially as described.

7. In a coal-dust-firing apparatus, the combination with a suitable air-supply pipe, of a coal-dust or fuel supply pipe having an opening into said air-pipe, a coal-dust-deflecting device arranged in the air-supply pipe beneath the opening of the fuel-supply pipe, a shaft to which said deflecting device is secured, a feeding device secured to said shaft and rotating therewith; said feeding device having one or more radially-adjustable scoops which feed the fuel to the deflecting device, together with means for simultaneously adjusting said scoops, substantially as described.

8. In a coal-dust-firing apparatus in which the coal-dust is mixed with air and the mixture conveyed into the combustion-chamber by the draft of the chimney or by forced draft the combination with a vertical air-pipe of a coal-dust-supply pipe arranged centrally within the air-pipe and a coal-dust-deflecting device placed beneath the discharge end of the coal-dust-supply pipe, substantially as and for the purpose set forth.

9. In a coal-dust-firing apparatus the combination with a vertical air-pipe of a coal-dust-supply pipe arranged centrally within the air-pipe a coal-dust-deflecting device placed beneath the supply-pipe and rotating on a central axis, and means for forcing air through said air-pipe so as to commingle with the coal-dust substantially as and for the purpose set forth.

10. In a coal-dust-firing apparatus the combination with a vertical air-pipe of a coal-dust-supply pipe arranged centrally within the air-pipe a coal-dust-deflecting device placed beneath the supply-pipe on a central shaft and a fan-wheel on this shaft for imparting to the deflecting device a rotary motion by means of the current of air passing through the air-pipe so as to commingle with the coal-dust, substantially as and for the purpose set forth.

11. In a coal-dust-firing apparatus the combination with a vertical air-pipe of a coal-dust-supply pipe arranged centrally within the air-pipe, a coal-dust-deflecting device beneath the supply-pipe and spiral ribs inside the air-pipe for imparting a whirling motion to the current of air so as to commingle with the coal-dust, substantially as and for the purpose set forth.

12. In a coal-dust-firing apparatus alternately operated by forced and natural draft the combination with a vertical air-pipe of a coal-dust-supply pipe centrally arranged within the air-pipe, a coal-dust-deflecting device beneath the supply-pipe, an adjustable casing surrounding the air-pipe at its entrance-opening, a transverse flat plate with a central opening against which plate the casing works, an air-blast-supply pipe opening centrally in the flat plate, and means for cutting off the air-blast supply, substantially as and for the purpose set forth.

13. In a coal-dust-firing apparatus the combination with a vertical air-pipe of a coal-dust-supply pipe arranged centrally within the air-pipe, a coal-dust-deflecting device beneath the supply-pipe and diverting means disposed in the mouth of the passage conveying the mixture of air and coal-dust into the combustion-chamber, substantially as and for the purpose set forth.

14. In a coal-dust-firing apparatus the combination with a vertical air-pipe of a coal-dust-supply pipe arranged centrally within the air-pipe, a coal-dust-deflecting device beneath the supply-pipe on a central shaft, a fan-wheel on this shaft operated by the current of air so as to rotate the deflecting device and an immovable fan-wheel, the vanes of which are adjustable as louver-boards and act as a directing-wheel for the driving fan-wheel, substantially as and for the purpose set forth.

15. In a coal-dust-firing apparatus the combination with a vertical air-pipe of a coal-dust-supply pipe arranged centrally within the air-pipe, a coal-dust-deflecting device placed beneath the supply-pipe, a central shaft to which the deflecting device is secured, a fan-wheel on this shaft operated by the current of air, and a coal-dust-feeding device arranged within the supply-pipe secured to and driven by the shaft of the deflecting device, substantially as and for the purpose set forth.

16. In a coal-dust-firing apparatus the combination with a vertical air-pipe of a coal-dust-supply pipe arranged centrally within the air-pipe, a coal-dust-deflecting device placed beneath the supply-pipe on a central shaft, a fan-wheel on this shaft operated by the current of air and a coal-dust-feeding device arranged within the supply-pipe on the shaft of the deflecting device and consisting of radially-adjustable scoops which wipe the coal-dust from an annular horizontal disk, substantially as and for the purpose set forth.

17. In a coal-dust-firing apparatus the combination with a vertical air-pipe of a coal-dust-supply pipe arranged centrally within the air-pipe, a coal-dust-deflecting device beneath the supply-pipe, a vertical combustion-chamber and an annular chamber surrounding the combustion-chamber and adapted to heat the supplemental air introduced into the combustion-chamber through its upper mouth, substantially as and for the purpose set forth.

18. In a coal-dust-firing apparatus the combination with a vertical air-pipe of a coal-dust-supply pipe arranged centrally within the air-pipe, a coal-dust-deflecting device beneath the supply-pipe, a vertical combustion-chamber, an annular chamber surrounding the combustion-chamber and adapted to heat the supplemental air introduced into the combustion-chamber through its upper mouth and another annular chamber surrounding the exit-mouth of the combustion-chamber and adapted to heat the supplemental air mixed with the fire-gases leaving the combustion-chamber, substantially as and for the purpose set forth.

In testimony whereof I have hereunto set my hand in the presence of two subscribing witnesses.

CARL WEGENER.

Witnesses:
  W. HAUPT,
  CHAS. KRÜGER.